(12) United States Patent
Lee

(10) Patent No.: US 9,169,624 B2
(45) Date of Patent: Oct. 27, 2015

(54) ADJUSTABLE WATER FLOW CONTROL APPARATUS FOR SHOWERS

(71) Applicant: Ransom Man Pan Lee, Kowloon (HK)

(72) Inventor: Ransom Man Pan Lee, Kowloon (HK)

(73) Assignee: AQUAmate K&B Limited, Kowloon (HK)

( * ) Notice: Subject to any disclaimer, the term of this patent is extended or adjusted under 35 U.S.C. 154(b) by 124 days.

(21) Appl. No.: 14/190,037

(22) Filed: Feb. 25, 2014

(65) Prior Publication Data

US 2015/0240461 A1    Aug. 27, 2015

(51) Int. Cl.
*G05D 7/01*    (2006.01)
*E03C 1/02*    (2006.01)
*F16L 55/00*   (2006.01)

(52) U.S. Cl.
CPC .. *E03C 1/02* (2013.01); *F16L 55/00* (2013.01)

(58) Field of Classification Search
CPC ... F16K 1/52; F16K 31/44; Y10T 137/87273; Y10T 137/88046; Y10T 137/9464
USPC .......... 138/43, 45, 46; 137/614.19, 599.01; 251/213, 319–321, 339; 239/583
See application file for complete search history.

(56) References Cited

U.S. PATENT DOCUMENTS

| | | | | |
|---|---|---|---|---|
| 669,845 | A * | 3/1901 | Melavin | B05B 1/3013 239/586 |
| 3,063,463 | A * | 11/1962 | Gfoll | B60C 23/0496 137/227 |
| 3,192,953 | A * | 7/1965 | Wolf | F04B 39/08 137/614.19 |
| 5,960,485 | A * | 10/1999 | Mihara | E03D 9/085 239/586 |
| 7,219,850 | B2 * | 5/2007 | Burnworth | B05B 1/3013 137/503 |
| 2011/0233439 | A1 * | 9/2011 | Lee | F16K 35/027 251/319 |

* cited by examiner

*Primary Examiner* — Patrick F Brinson

(57) ABSTRACT

The present invention is an adjustable water flow control apparatus for showers which includes an outer housing, an outer inlet member, an outer valve, an inner housing, an inner inlet member, an inner valve, an outlet, an actuating means and a biasing means. The actuating means is configured to axially move the inner housing together with the inner inlet member between a decreased flow position and an increased flow position for water flow control.

12 Claims, 2 Drawing Sheets

ADJUSTABLE WATER FLOW CONTROL APPARATUS FOR SHOWERS

BACKGROUND OF THE INVENTION

The present invention relates to water flow control apparatus and more particularly pertains to an adjustable water flow control apparatus for showers.

There are various types of water flow control apparatus for showers available in the marketplace. A typical example is a water flow restrictor in form of a valve disc positioned in the water pipe, wherein an orifice with a reduced diameter is provided in the valve disc so as to restrict water flow from the inlet of the water pipe to the outlet of the water pipe. However, such water flow restrictor does not allow users to adjust the water flow, rendering it undesirable for users.

BRIEF SUMMARY OF THE INVENTION

In view of the aforesaid disadvantages now present in the prior art, the present invention provides an adjustable water flow control apparatus for showers which provides a convenient mechanism for a user to adjust water flow rate.

To attain this, the present invention generally comprises an outer housing which receives and surrounds a guiding sleeve therein;

an outer inlet member securely engaged with a first end of the outer housing;

an outer valve securely received within the outer inlet member for controlling water flow into the outer housing;

an inner housing disposed with a guiding means on an exterior surface thereof; the guiding means cooperates with the guiding sleeve for axial movement of the inner housing along and within the outer housing;

an inner inlet member securely engaged with a first end of the inner housing and having a tapered end which cooperates with a tapered end of the guiding sleeve; the inner inlet member is in water communication with the outer inlet member;

an inner valve securely received within the inner inlet member for controlling water flow into the inner housing; the inner valve has a smaller flow rate than the outer valve;

the inner housing defines a first water pathway which is in water communication with an outlet at a second end of the outer housing;

area between the guiding sleeve and the inner housing defines a second water pathway which is in water communication with the outlet; and an actuating means configured to axially move the inner housing together with the inner inlet member between a decreased flow position and an increased flow position;

at the decreased flow position, the tapered end of the inner inlet member engages with the tapered end of the guiding sleeve in a water sealed manner so that water from the outer inlet member is blocked from flowing through an intersection between the inner inlet member and the guiding sleeve to enter the second water pathway and only flows through the inner inlet member to enter the first water pathway;

at the increased flow position, the tapered end of the inner inlet member disengages from the tapered end of the guiding sleeve so that water from the inner inlet member flows through the inner inlet member to enter the first water pathway and flows through the intersection between the inner inlet member and the guiding sleeve to enter the second water pathway.

The actuating means comprises a pushbutton movable along a traverse direction in relation to a longitudinal axis of the outer housing; the pushbutton has an outer end exposed outside the outer housing and an inner end having two parallel projections; each of the projections has a first inclined surface; the inner housing has a second end disposed with two second inclined surfaces which cooperates with the first inclined surfaces to permit axial displacement of the inner housing between the decreased flow position and the increased flow position; at the decreased flow position, the pushbutton is at a default position; at the increased flow position, the pushbutton is depressed to a depressed position and as the first inclined surfaces slides along the second inclined surfaces, the inner housing is driven to move axially towards the outer inlet member.

The inner housing is biased towards the decreased flow position by a biasing means.

The biasing means is a spring which surrounds the inner housing with a first end abutting against the tapered end of the guiding sleeve and a second end abutting against the second end of the inner housing.

The outer housing, the outer inlet member, the outer valve, the inner housing, the inner inlet member and the inner valve are coaxially disposed.

The outer inlet member is in water communication with a water-supplying pipe.

The outer inlet member is removably engaged with the water-supplying pipe by various engagement means available in the marketplace, such as threaded engagement.

The outlet is in water communication with a showerhead handle.

The outlet is securely engaged with the showerhead handle to form an integral body, or removably engaged with the showerhead handle by various engagement means available in the marketplace, such as threaded engagement.

A first O-ring is disposed at the intersection between the tapered end of the inner inlet member and the tapered end of the guiding sleeve for blocking water from flowing through the intersection at the decreased flow position.

A second O-ring is disposed between the outer housing and the guiding sleeve to prevent water from passing between the outer housing and the guiding sleeve.

A pushbutton holder extends along the outer housing and the guiding sleeve for receiving the pushbutton; a third O-ring is disposed between the pushbutton and the pushbutton holder to prevent water from leaking.

The operation of the present invention is as follows:

When the pushbutton is at the default position, the inner housing together with the inner inlet member is at the decreased flow position. The tapered end of the inner inlet member engages with the tapered end of the guiding sleeve in a water sealed manner. As a result, water from the outer inlet member is blocked from flowing through the intersection between the inner inlet member and the guiding sleeve to enter the second water pathway, and only flows through the inner inlet member to enter the first water pathway. As the flow rate of the inner valve of the inner inlet member is smaller than the outer valve, the resultant flow rate is therefore reduced to that of the inner valve.

If the user wishes to increase the flow rate for a certain period of time, the user depresses the pushbutton. The first inclined surfaces of the pushbutton is driven to slide along the second inclined surfaces, and the inner housing is driven to move axially towards the outer inlet member to the increased flow position, where the tapered end of the inner inlet member disengages from the tapered end of the guiding sleeve so that water from the outer inlet member flows through the inner inlet member to enter the first water pathway and flows through the intersection between the inner inlet member and the guiding sleeve to enter the second water pathway. The resultant flow rate is therefore increased to that of the outer valve.

When the user releases the pushbutton, the biasing means forces the inner housing together with the inner inlet member to move axially to return to the decreased flow position. The resultant flow is therefore reduced to that of the inner valve.

DETAILED DESCRIPTION OF THE INVENTION

Figure 1:
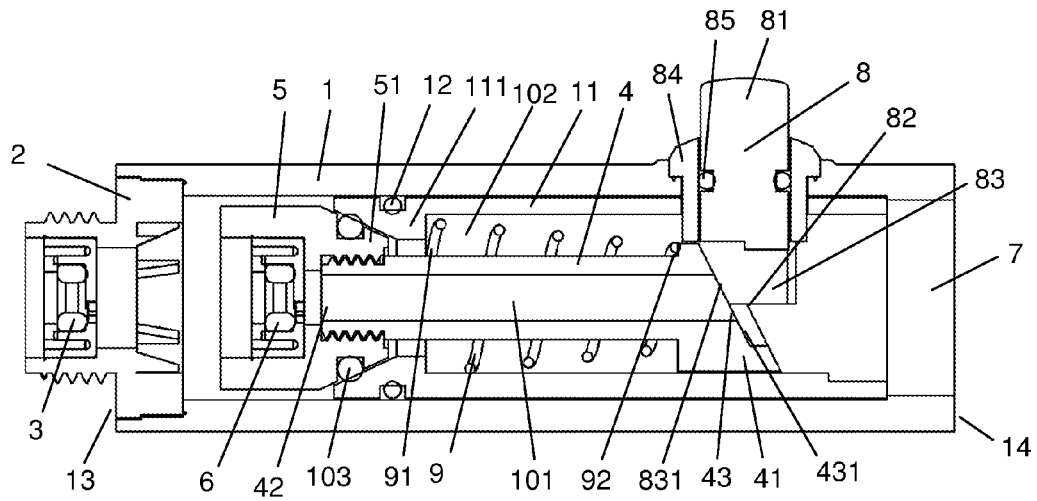
FIG. 1 is a cross sectional view of an embodiment of the present invention at the decreased flow position.
Figure 2:
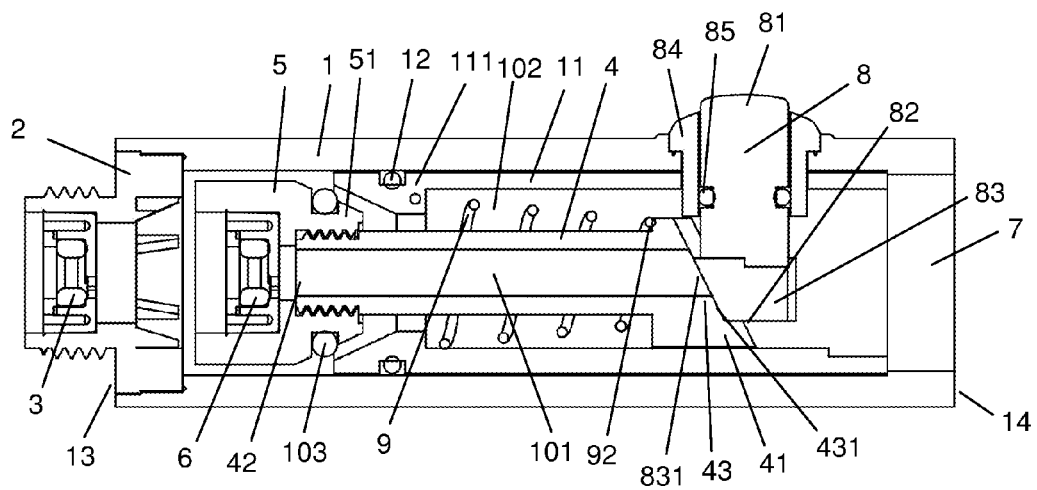
FIG. 2 is a cross sectional view of an embodiment of the present invention at the increased flow position.
Figure 3:
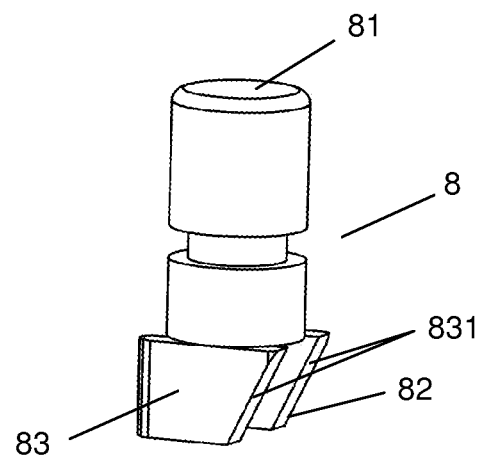
FIG. 3 is a perspective view of the pushbutton of an embodiment of the present invention.
Figure 4:
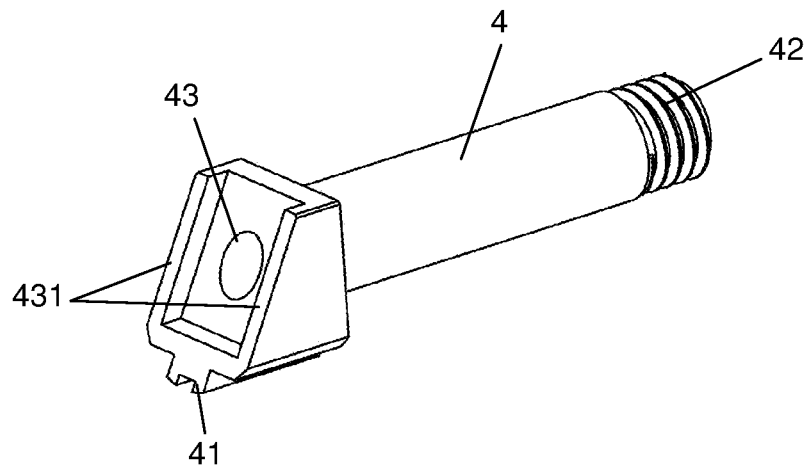
FIG. 4 is a perspective view of the inner housing of an embodiment of the present invention.

As illustrated in FIGS. 1-4, a preferred embodiment of the present invention generally comprises an outer housing 1, an outer inlet member 2, an outer valve 3, an inner housing 4, an inner inlet member 5, an inner valve 6, an outlet 7, an actuating means 8 and a biasing means 9. The outer housing 1, the outer inlet member 2, the outer valve 3, the inner housing 4, the inner inlet member 5 and the inner valve 6 are coaxially disposed.

The outer housing 1 receives and surrounds a guiding sleeve 11 therein. An O-ring 12 is disposed between the outer housing 1 and the guiding sleeve 11 to prevent water from passing between the outer housing 1 and the guiding sleeve 11.

The outer inlet member 2 is securely engaged with a first end 13 of the outer housing 1. It is in water communication with a water-supplying pipe (not shown), and is removably engaged with the water-supplying pipe by various engagement means available in the marketplace, such as threaded engagement.

The outer valve 3 is securely received within the outer inlet member 2 for controlling water flow into the outer housing 1.

The inner housing 4 is disposed with a guiding means 41 on an exterior surface thereof. The guiding means 41 cooperates with the guiding sleeve 11 for axial movement of the inner housing 4 along and within the outer housing 1. The inner housing 4 defines a first water pathway 101 which is in water communication with the outlet 7 at a second end 14 of the outer housing 1. Area between the guiding sleeve 11 and the inner housing 4 defines a second water pathway 102 which is in water communication with the outlet 7. The outlet 7 is in water communication with a showerhead handle (not shown), and is securely engaged with the showerhead handle to form an integral body or removably engaged with the showerhead handle by various engagement means available in the marketplace, such as threaded engagement. The guiding means 41 in this embodiment is in form of two projections which are received in two grooves provided at the guiding sleeve 11.

The inner inlet member 5 is securely engaged with a first end 42 of the inner housing 4 and having a tapered end 51 which cooperates with a tapered end 111 of the guiding sleeve 11. The inner inlet member 5 is in water communication with the outer inlet member 2.

The inner valve 6 is securely received within the inner inlet member for controlling water flow into the inner housing 4. The inner valve 6 has a smaller flow rate than the outer valve 3. Both the outer valve 3 and the inner valve 6 are common valves available in the marketplace and so detailed structures thereof are not provided herein.

The actuating means 8 in this embodiment is a pushbutton and it is configured to axially move the inner housing 4 together with the inner inlet member 5 between a decreased flow position and an increased flow position.

The pushbutton being the actuating means 8 is movable along a traverse direction in relation to a longitudinal axis of the outer housing 1. The pushbutton being the actuating means 8 has an outer end 81 exposed outside the outer housing 1 and an inner end 82 having two parallel projections 83; each of the projections 83 has a first inclined surface 831. The inner housing 4 has a second end 43 disposed with two second inclined surfaces 431 which cooperates with the first inclined surfaces 831 to permit axial displacement of the inner housing 4 between the decreased flow position and the increased flow position. A pushbutton holder 84 extends along the outer housing 1 and the guiding sleeve 11 for receiving the pushbutton 8. An O-ring 85 is disposed between the pushbutton 8 and the pushbutton holder 84 to prevent water from leaking.

At the decreased flow position, the pushbutton 8 is at a default position; the tapered end 51 of the inner inlet member 5 engages with the tapered end 111 of the guiding sleeve 11 in a water sealed manner so that water from the outer inlet member 2 is blocked from flowing through an intersection between the inner inlet member 5 and the guiding sleeve 11 to enter the second water pathway 102 and only flows through the inner inlet member 5 to enter the first water pathway 101. An O-ring 103 is disposed at the intersection between the tapered end 51 of the inner inlet member 5 and the tapered end 111 of the guiding sleeve 11 for blocking water from flowing through the intersection.

At the increased flow position, the pushbutton 8 is depressed to a depressed position and as the first inclined surfaces 831 slides along the second inclined surfaces 431, the inner housing 4 is driven to move axially towards the outer inlet member 2; the tapered end 51 of the inner inlet member 5 disengages from the tapered end 111 of the guiding sleeve 11 so that water from the inner inlet member 5 flows through the inner inlet member 5 to enter the first water pathway 101 and flows through the intersection between the inner inlet member 6 and the guiding sleeve 11 to enter the second water pathway 102.

The inner housing 4 is biased towards the decreased flow position by the biasing means 9. In this embodiment, the biasing means 9 is a spring which surrounds the inner housing 4 with a first end 91 abutting against the tapered end 111 of the guiding sleeve 11 and a second end 92 abutting against the second end 43 of the inner housing 4.

The operation of the present embodiment is as follows:

When the pushbutton 8 is at the default position, the inner housing 4 together with the inner inlet member 5 is at the decreased flow position. The tapered end 51 of the inner inlet member 5 engages with the tapered end 111 of the guiding sleeve 11 in a water sealed manner. As a result, water from the outer inlet member 2 is blocked from flowing through the intersection between the inner inlet member 5 and the guiding sleeve 11 to enter the second water pathway 102, and only flows through the inner inlet member 5 to enter the first water pathway 101. As the flow rate of the inner valve 6 of the inner inlet member is smaller than the outer valve 3, the resultant flow rate is therefore reduced to that of the inner valve 6.

If the user wishes to increase the flow rate for a certain period of time, the user depresses the pushbutton 8. The first inclined surfaces 831 of the pushbutton 8 is driven to slide along the second inclined surfaces 431, and the inner housing 4 is driven to move axially towards the outer inlet member 2 to the increased flow position, where the tapered end 51 of the inner inlet member 5 disengages from the tapered end 111 of the guiding sleeve 11 so that water from the outer inlet member 2 flows through the inner inlet member 5 to enter the first water pathway 101 and flows through the intersection between the inner inlet member 5 and the guiding sleeve 11 to enter the second water pathway 102. The resultant flow rate is therefore increased to that of the outer valve 3.

When the user releases the pushbutton 8, the spring being the biasing means 9 forces the inner housing 4 together with the inner inlet member 5 to move axially to return to the decreased flow position. The resultant flow is therefore reduced to that of the inner valve 3.

The above embodiment is a preferred embodiment of the present invention. The present invention is capable of other embodiments and is not limited by the above embodiment. Any other variation, decoration, substitution, combination or simplification, whether in substance or in principle, not deviated from the spirit of the present invention, is replacement or substitution of equivalent effect and falls within the scope of protection of the present invention.

What is claimed is:

1. An adjustable water flow control apparatus for showers comprising:
    an outer housing which receives and surrounds a guiding sleeve therein;
    an outer inlet member securely engaged with a first end of the outer housing;
    an outer valve securely received within the outer inlet member for controlling water flow into the outer housing;
    an inner housing disposed with a guiding means on an exterior surface thereof, wherein the guiding means cooperates with the guiding sleeve for axial movement of the inner housing along and within the outer housing;
    an inner inlet member securely engaged with a first end of the inner housing and having a tapered end which cooperates with a tapered end of the guiding sleeve; the inner inlet member is in water communication with the outer inlet member;
    an inner valve securely received within the inner inlet member for controlling water flow into the inner housing; the inner valve has a smaller flow rate than the outer valve;
    the inner housing defines a first water pathway which is in water communication with an outlet at a second end of the outer housing;
    area between the guiding sleeve and the inner housing defines a second water pathway which is in water communication with the outlet; and
    an actuating means configured to axially move the inner housing together with the inner inlet member between a decreased flow position and an increased flow position;
    at the decreased flow position, the tapered end of the inner inlet member engages with the tapered end of the guiding sleeve in a water sealed manner so that water from the outer inlet member is blocked from flowing through an intersection between the inner inlet member and the guiding sleeve to enter the second water pathway and only flows through the inner inlet member to enter the first water pathway;
    at the increased flow position, the tapered end of the inner inlet member disengages from the tapered end of the guiding sleeve so that water from the inner inlet member flows through the inner inlet member to enter the first water pathway and flows through the intersection between the inner inlet member and the guiding sleeve to enter the second water pathway.

2. The adjustable water flow control apparatus for showers as in claim 1, wherein the actuating means comprises a pushbutton movable along a traverse direction in relation to a longitudinal axis of the outer housing; the pushbutton has an outer end exposed outside the outer housing and an inner end having two parallel projections; each of the projections has a first inclined surface; the inner housing has a second end disposed with two second inclined surfaces which cooperates with the first inclined surfaces to permit axial displacement of the inner housing between the decreased flow position and the increased flow position; at the decreased flow position, the pushbutton is at a default position; at the increased flow position, the pushbutton is depressed to a depressed position and as the first inclined surfaces slides along the second inclined surfaces, the inner housing is driven to move axially towards the outer inlet member.

3. The adjustable water flow control apparatus for showers as in claim 2, wherein the inner housing is biased towards the decreased flow position by a biasing means.

4. The adjustable water flow control apparatus for showers as in claim 3, wherein the biasing means is a spring which surrounds the inner housing with a first end abutting against the tapered end of the guiding sleeve and a second end abutting against the second end of the inner housing.

5. The adjustable water flow control apparatus for showers as in claim 1, wherein the outer housing, the outer inlet member, the outer valve, the inner housing, the inner inlet member and the inner valve are coaxially disposed.

6. The adjustable water flow control apparatus for showers as in claim 1, wherein the outer inlet member is in water communication with a water-supplying pipe.

7. The adjustable water flow control apparatus for showers as in claim 6, wherein the outer inlet member is removably engaged with the water-supplying pipe.

8. The adjustable water flow control apparatus for showers as in claim 1, wherein the outlet is in water communication with a showerhead handle.

9. The adjustable water flow control apparatus for showers as in claim 8, wherein the outlet is securely engaged with the showerhead handle to form an integral body, or removably engaged with the showerhead handle.

10. The adjustable water flow control apparatus for showers as in claim 1, wherein a first O-ring is disposed at the intersection between the tapered end of the inner inlet member and the tapered end of the guiding sleeve for blocking water from flowing through the intersection at the decreased flow position.

11. The adjustable water flow control apparatus for showers as in claim 1, wherein a second O-ring is disposed between the outer housing and the guiding sleeve to prevent water from passing between the outer housing and the guiding sleeve.

12. The adjustable water flow control apparatus for showers as in claim 2, wherein a pushbutton holder extends along the outer housing and the guiding sleeve for receiving the pushbutton; a third O-ring is disposed between the pushbutton and the pushbutton holder to prevent water from leaking.

* * * * *